May 7, 1968
C. W. MARTIN ET AL
3,381,529
STATIC ANEMOMETER
Filed Feb. 11, 1966
3 Sheets-Sheet 1
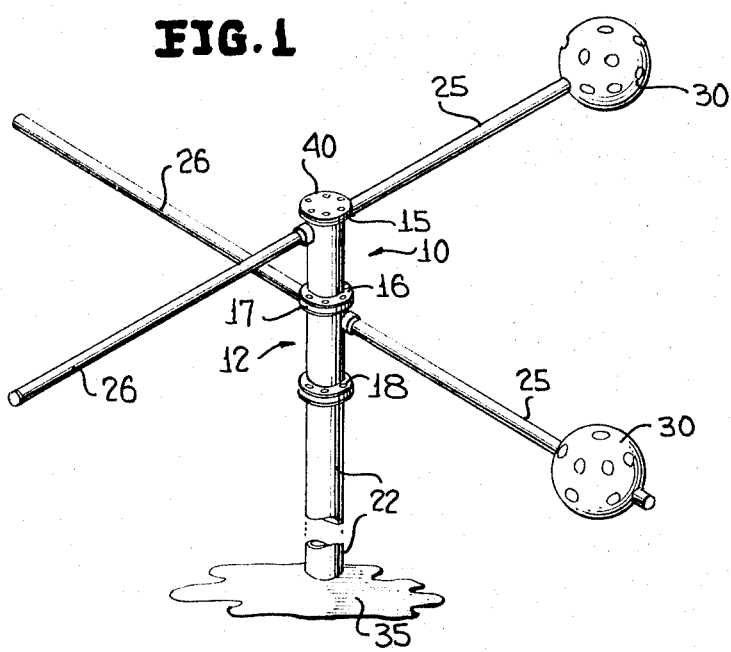
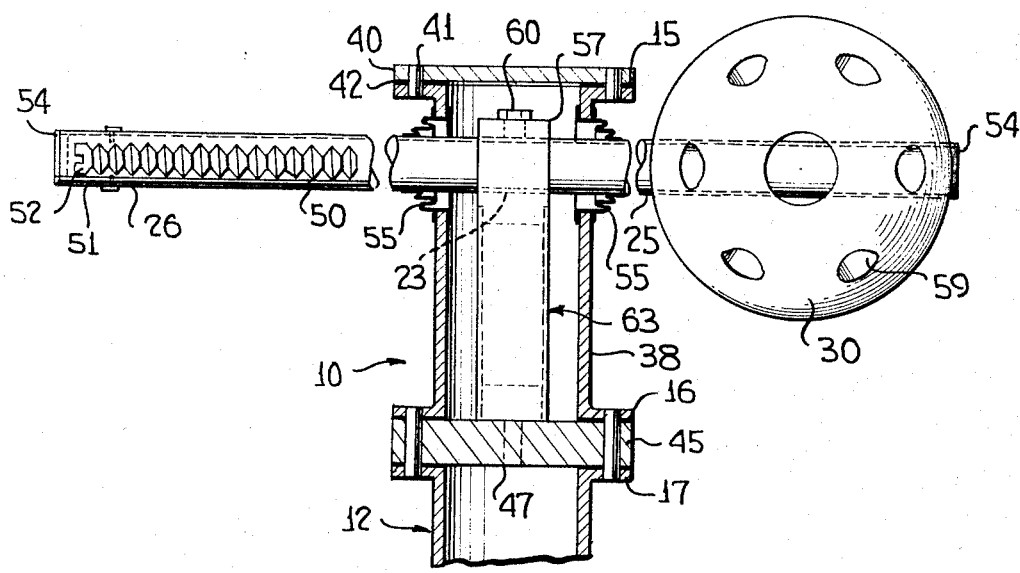
INVENTORS
CHARLES W. MARTIN &
LEE P. HERRINGTON
BY Hurwitz & Rose
ATTORNEYS May 7, 1968  C. W. MARTIN ET AL  3,381,529
STATIC ANEMOMETER Filed Feb. 11, 1966  3 Sheets-Sheet 2

SLOPE $O\text{-}A = R_2/R_1$
SLOPE $A\text{-}B = 1/R_1(1/R_2 + 1/R_3)$

TRANSFER FUNCTION

INVENTORS
CHARLES W. MARTIN &
LEE P. HERRINGTON

BY Hurvitz & Rose

ATTORNEYS

INVENTORS
CHARLES W. MARTIN &
LEE P. HERRINGTON

BY Hurwitz & Rose

ATTORNEYS

United States Patent Office 3,381,529
Patented May 7, 1968

3,381,529
STATIC ANEMOMETER
Charles W. Martin, Lincoln, Nebr., and Lee P. Herrington, Syracuse, N.Y., assignors to Melpar, Inc., Falls Church, Va., a corporation of Delaware
Filed Feb. 11, 1966, Ser. No. 526,915
16 Claims. (Cl. 73—189)

ABSTRACT OF THE DISCLOSURE

A static anemometer compensated for all accelerations and comprising two orthogonal drag elements, mounted for rotation on a common vertical axis, each of which actuates a resistive strain gage of the torsional type, the outputs of the strain gages being vectorially combined to provide an indication of wind speed, regardless of wind direction.

---

The present invention relates generally to meteorological instruments and, more particularly, to a new and improved static anemometer.

Devices embodying the concepts of the present invention are especially useful in the field of oceanography, although it will be understood that the invention is not limited to such applications, but is capable of practical utility in a variety of other situations.

It is apparent that any device to be used on an unattended oceangoing platform such as an oceanographic buoy must meet certain rigid requirements. Especially is this true in cases where the device is to constitute an instrument whose basic purpose is the measurement of meteorological phenomena which ultimately affect the motion of the platform on which the device is mounted. The location of such an instrument renders it highly unlikely that the instrument will receive any regular servicing; and, in any event, servicing and inspection are not readily carried out under conditions to which the instrument is subjected, so that it must be assumed that they will be performed, if at all, at rather infrequent intervals. This requirement of long and continuous performance with high sensitivity and accuracy of measurement, and with little likelihood of periodic maintenance, make it imperative that the instrument be highly reliable.

The need for reliability is further imposed by the extreme environmental conditions to which the instrument is subjected when mounted on an oceangoing platform—a wet corrosive atmosphere; continual wetting by salt water spray, extremes of temperature; ice loading; exposure to animals and birds, and, possibly, to damage by curious humans. Reliability, in turn, suggests simplicity of construction; as complexity of instrumentation increases the number of possible sources of failure increases, with a corresponding decrease in reliability.

Accordingly, it is a principal object of the present invention to provide a simple, low cost, rugged anemometer particularly adapted to measure wind speed with moderate accuracy under extreme environmental conditions.

It is a more specific object of the present invention to provide a static anemometer for use on oceangoing buoys.

Conventional anemometers have met with little success when utilized on unattended oceangoing platforms. The standard cup anemometer, for example, has the disadvantages of extreme sensitivity to adverse conditions at several points, particularly the bearings and spindles; and fragility of the cups themselves. Similar drawbacks have been found in attempts to use the standard aerovane wind sensor for oceanographic applications, and, in addition, this type of device is relatively expensive. The sonic anemometer has the advantage that it may readily be "hidden" in the mast structure, and is therefore less likely to be subjected to human tampering. In use, however, it requires periodic calibration, and undergoes rapid loss of signal strength in the event of any misalignment of the transmitter and receiver heads. Some of the difficulties experienced with both cup anemometers and sonic devices are reported in Badgley et al, Buoy Technology, Supplement (1963), pages 65–85, where it is noted, for example, that such instruments require a good deal of field servicing and readjustment. Pressure measuring devices are also unsuitable because of the relative ease with which they are plugged by salt deposits or ice. A variety of other more exotic methods of measuring wind speed are available, but, in general, they all require complex equipment or constant attention.

It is therefore another broad object of the present invention to provide an anemometer which overcomes the various disadvantages of conventional anemometers in seagoing applications.

An extremely simple component of a suitable anemometer might be a drag device suitably roughened so that the boundary layer would at all times be turbulent. In J. Appl. Met., 2, pp. 412–416 (1963), Reed and Lynch noted that a hollow plastic ball showed no change in the drag-dynamic pressure curve slope and, in addition, sought no alignment different from the wind vector, as had been observed with smooth balls. However, when the ball is mounted on a vertical rod and this assembly is mounted on a platform subjected to pitching, it is extremely difficult to separate the forces attributable to wind and those due to acceleration of the ball and rod. While the difficulty might be overcome to some extent by bucking the output of the ball and rod against a "balless" rod, the extra electronics required for such purpose would create a substantial additional expense and it is also quite likely that the two rods would become out of phase.

We have found that mechanical or built-in cancellation is achieved by placing the drag units on horizontal arms, with counterbalancing arms to cancel acceleration torque forces. Measurement of torque caused by wind drag is achieved by the use of strain sensing elements in a load cell coupled to each arm. Bending stresses caused by the acceleration forces are eliminated by proper placement of the strain sensing elements. The vector wind is measured by sensing the orthogonal components, using two of the ball assemblies mounted at right angles to one another. Standard anemometer cups on the arms were found to be useless because of the drag versus angle-of-attack curves for such elements.

Two of the principal features of an anemometer according to the present invention are the use of two drag spheres to resolve the vector wind, and the use of counterweighted arms and torque sensing to eliminate errors due to pitch and heave of the supporting platform.

In addition to overcoming several disadvantages of conventional anemometers in seagoing applications, the present invention offers the advatages of an anemometer having no moving parts (i.e., static), rugged construction, and insensitivity to pitch and heave accelerations experienced as a result of the movements of the platform on which it is mounted.

The above and still further objects, features and attendant advantages of the present invention will become apparent from a consideration of the following detailed description of a specific embodiment thereof, especially when taken in conjunction with the accompanying drawings, in which:

FIGURE 1 is a perspective view of the general configuration of a preferred embodiment;

FIGURE 2 is a cross-sectional view of one anemometer module of the embodiment of FIGURE 1;

Figure 3:
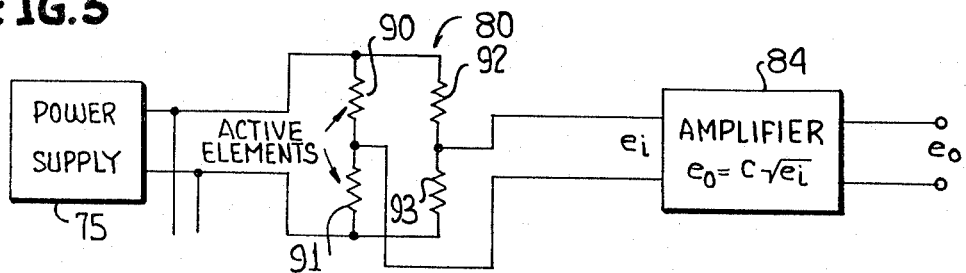
FIGURE 3 is a block diagram of one channel of the electronic circuit associated with the anemometer modules.

Referring now to the drawings, and in particular, to FIGURES 1 and 2, a preferred embodiment of the static anemometer comprises a pair of identical modules 10, 12, with flanged connections 15, 16, and 17, 18, respectively, stacked perpendicularly to each other in a horizontal configuration upon a supporting post 22. Each module includes respective first and second arms 25, 26, the arms associated with each module being simply an extension of the same rod or tube. Each arm 25 has mounted at the end thereof a drag sphere 30, which will be described in greater detail presently.

Supporting post 22 serves as a means for mounting the anemometer modules to the floating platform, a surface of which is generally designated by reference numeral 35, and, in addition, houses the electrical cables connected to transducers in the modules. The floating platform may simply be an ocean-going buoy of any conventional unattended type.

The structure of each module of anemometer is shown more clearly in the cross-sectional view of FIGURE 2. Since the two modules are identical, a showing and description of one is deemed sufficient to characterize both.

Each anemometer module, for example, 10 shown in FIGURE 2, includes a tubular portion 38 having the flanged ends 15 and 16 for mounting to the cooperating module and any additional post structure. In the case of module 10, the upper of the two modules, flange 15 is connected to an end plate 40, which serves to close the end of the tubular section 38, via any suitable fasteners such as bolts and nuts (not shown) located at the circularly aligned holes 41. To prevent moisture from gaining entry to the interior of the tubular section, a rubber seal or gasket, e.g. 42, is interposed between each flange portion and the adjacent connecting member. Lower flange 16 is similarly coupled to the upper flange 17 of module 12 through a cylindrical plate 45 having correspondingly aligned bolt holes and further having one or more longitudinally aligned holes, e.g., 47, through which the electrical cables pass between the respective transducers anh a package containing the electronic circuitry.

Rod or tube 23 extends horizontally through tubular section 38 to form the two arms 25 and 26, the former supporting a drag sphere 30 and the latter a counterweight 50. In this embodiment element 23 is a tube, and counterweight 50 comprises a tapped insert 51 secured within the tube end (arm 26) and containing a screw 52. The length and composition of element 50 is such as to equal the weight of the drag sphere or ball 30 on the end of the opposite arm, the two arms being of equal length.

Drag sphere 30 is a hollow ball whose surface is perforated by a plurality of preferably approximately round holes 59, and, in addition, by pair of holes through which arm 25 extends. The ends of tube 23 are closed by cover plates 54 and a pair of soft rubber seals 55 are disposed about the points of intersection between the tube and tubular housing or section 38.

Tube 23 also extends through an axially disposed rod 57 interiorly of housing 38, the tube being secured at the axis of the assembly by a retaining screw 60. Rod 57, in turn, provides a support for a load cell 63 operating as a torsion-sensitive transducer, this assembly being mounted in any convenient manner upon plate 45. Electrical cables are connected to the strain sensing elements of the load cells and pass through the interior of the tubular housings and the supporting post via convenient holes, e.g., 47, to the package containing the electronics.

As previously stated, the two modules are identical except that each is oriented at 90 degrees to the other so that each senses one orthogonal component of the wind vector.

In one model constructed according to the preferred embodiment thus far described, tubular section 38 was composed of 6061 T-6 aluminum with an outer diameter of 1¾ inches and a ⅛ inch wall. Tube 23, rod 57 and plate 45 were of the same material as the tubular section. The tube 23 had an overall length of 34 inches, 17 inches on either side of the axis of the assembly, and a ⅝ inch outer diameter with a 0.035 inch wall. Insert 51 of counterweight 50 was constructed of nylon, and screw 52 was of stainless steel and had a length of approximately 4 inches. The drag sphere 30 was a hollow plastic ball having a 3.6 inch diameter with 24 round holes perforating the surface thereof. Each hole had diameter of 0.625 inch. It is to be emphasized that there is nothing particularly critical in the use of these materials and dimensions and that no limitations are to be placed upon the invention as a result of the specific details of construction recited, except as set forth in the appended claims.

Continuing with the description of the constructed model, load cell or torsion-sensitive transducer 63 comprised a cylindrical tube of 0.75 inch diameter with a 0.0625 inch wall and a length of 3.5 inches. The tube was wound with strain-sensitive constantan wire of 0.001 inch diameter, commonly used in resistance strain gages. The wire was wound in the form of a helix of two layers, each layer making an angle of 90 degrees with the other and each at an angle of 45 degrees relative to the axis of the tube. A coating of insulating plastic was deposited on each layer of the winding.

As will more fully be discussed in the ensuing description, each of the layers of strain-sensitive wire is employed as one arm of a resistance bridge, and by virtue of the transducer construction bridge unbalance occurs only when the load cell is subjected to twisting. That is, the orthogonal wire layers produce a cancellation of signals caused by tension, compression and/or bending forces on the tube on which the layers are wound, or by temperature changes experienced by the tube.

The criteria for selection of size and material for the load cell included the requirements that strains be large enough to produce signals well above the noise level, that the tube size be large enough to avoid excessive difficulty in winding the strain-sensitive wire, and that it have adequate stiffness to give the instrument a reasonably high natural frequency and adequate strength to withstand rough handling as well as forces attributable to the wind. The use of an acrylic resin tube of the above-specified dimensions was found to be compatible with these conflicting requirements, although it will be understood that other materials and sizes may be employed to provide equal or better performance and that such modifications are intended to fall within the scope of the present invention. The choice of an acrylic resin tube was based in part on its commercial availability in the desired size and the adequacy of its mechanical properties in that configuration (e.g., tensile strength of 10,000 p.s.i., shear strength of 9,000 p.s.i., and modulus of elasticity of $4 \times 10^5$ p.s.i.).

In a 120 m.p.h. wind, tensile, compressive and shearing stresses resulting from twisting of the load cell are each approximately 1025 p.s.i. In addition, the wind induces bending stresses in the load cell; about 1500 p.s.i. for a 120 m.p.h. wind. However, if this is added to the twisting-induced stresses of 1025 p.s.i. (admittedly a rough calculation, but, nevertheless, conservative), the total stress is only about one-fourth of the tensile strength of the acrylic tube.

Each layer of wire in the constructed embodiment comprised 153 inches of 0.001 inch diameter constantan wire with a resistance of 300 ohms per foot, resulting in a resistance of some 3800 ohms in each bridge arm. Strain sensed by the wire is approximately 3200 microinches per inch in a 120 m.p.h. wind, with tension on one layer of wire and compression on the other. In a 3 m.p.h. wind, the corresponding strain is 2 microinches per inch. Assuming a current of 0.02 ampere in each bridge arm, conservative in terms of the current carrying capacity of the load cell in view of the wide spacing between adjacent turns relative to that for a conventional constantan wire strain gage, the voltage output of the bridge is approximately 0.3 millivolt for a 3 m.p.h. wind and 0.485 volt for a 120 m.p.h. wind The natural frequency of torsional vibration of the anemometer is preferably several times higher than the highest wave frequency to which the floating platform can respond; for example, at least 10 times higher than the frequency of waves which might excite the oceangoing buoy on which the anemometer is mounted. Otherwise, one of the natural modes of the anemometer might be excited, a situation which could cause fatigue failure in the anemometer structure. While the natural frequencies of torsional and bending vibration may be increased still further relative to the wave response frequency of the buoy by increasing the rigidity of the load cell, this tends to decrease the sensitivity of the instrument, so that some compromise must be sought. In calculating the response frequency of the floating platform, it should be noted that a buoy, for example, will not respond to waves of lengths much shorter than its diameter. As an illustration, a buoy with a diameter of 7 feet is little affected by waves with a length of 2 feet, which corresponds to a wave period of 0.63 second or a frequency of 1.6 c.p.s.

In tests on the constructed model, the force on the drag sphere was observed to be $$F = 206 \times 10^{-4} V^2 \quad (1)$$

where the drag force F is expressed in pounds and V is wind speed in miles per hour. The equation was derived from observable data and the form of the equation agrees with the theoretical form for turbulent drag. Hence drag force on the sphere in this constructed embodiment is about 0.0018 pound at 3 m.p.h. and about 2.96 pounds at 120 m.p.h.

It will be appreciated that since the drag sphere (30) is balanced by a counterweight (50), pitch and heave accelerations encountered by the floating platform cause bending, tension, and compression in the load cell, but not torsion. This is to be distinguished from prior art drag sphere anemometers of which we are aware, where the instrument is sensitive to acceleration of its support. Moreover, as previously discussed, the transducer employed in our anemometer is so constructed that tension, compression, and bending forces produce no signal because of the self-cancelling effect of the load cell on such stresses.

Figure 4:
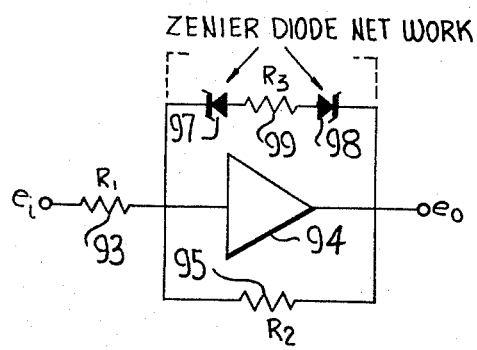
FIGURE 4 is a circuit diagram of the amplifier of FIGURE 3.

Referring now to FIGURE 3, the electronic circuit for the anemometer comprises a power supply 75 which may be used to provide power for the bridge in each channel, a bridge circuit 80 and a square root function operational amplifier 84 associated with each channel. Since both channels are identical, one associated with each anemometer module 10, 12, only one of the channels is shown in FIGURE 4 and a description of that channel is deemed sufficient to characterize the structure and operation of both. Each bridge circuit has a pair of active arms, here depicted as resistance elements 90 and 91, corresponding to the two layers of wire on the load cell for the particular module with which the channel is associated, and a pair of passive resistance arms 92 and 93 which are located in the electronics package removed from the modules. Connections between the active arms and the power supply and passive arms are provided by the electrical cables extending through support post 22 and tubular housings 38 (FIGURES 1 and 2). The output of each bridge is fed to a respective amplifier 84.

Since each bridge circuit has two active arms, the output is a linear function of drag and is proportional to the wind velocity squared. Thus, with the velocity V expressed in miles per hour, the output voltage of the bridge $e_1$ (in volts) is given by the expression $$e_1 = 3.33 V^2 \times 10^{-5} \quad (2)$$

The support arms 23 (each forming arms 25 and 26) of the two modules 10, 12, are mounted at right angles to each other, and thus the force transmitted to each load cell is proportional to the sine of the angle which the vector wind makes with the respective horizontal support arm. For the case where the "X" arm (arbitrarily selected) of the array is pointed toward a zero reference azimuth, the output voltages of the two bridges are $$e_x = 3.33 V^2 \sin \theta \times 10^{-5}$$
$$e_y = 3.33 V^2 \cos \theta \times 10^{-5} \quad (3)$$

where $e_x$ and $e_y$ are in volts and are respectively associated with the channels related to the X and Y support arms, V is the velocity of the wind vector, and $\theta$ is the reference azimuth.

As previously stated, for this particular embodiment the output signals from the bridge (i.e., the input signals to each amplifier, designated $e_1$) have a range of 0.3 mv. to 500 mv. over the range of wind speeds from 3 to 120 m.p.h. Amplifier 84 is adapted to amplify the applied input signal to a range of 0 to 5 volts linear with velocity (5 volts $= (K)$ 120 knots, 0.125 volt $= (K)$ 3 knots, where K is a constant). To this end, each amplifier is provided with a square root transfer function in the manner shown by the circuit of FIGURE 4 and the graphs of FIGURES 5 and 6.

Figure 5:
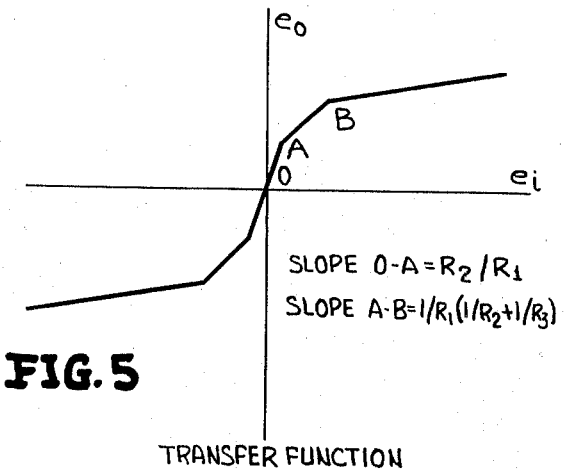
FIGURE 5 is a graph of the transfer function of the amplifier of FIGURE 4.
Figure 6:
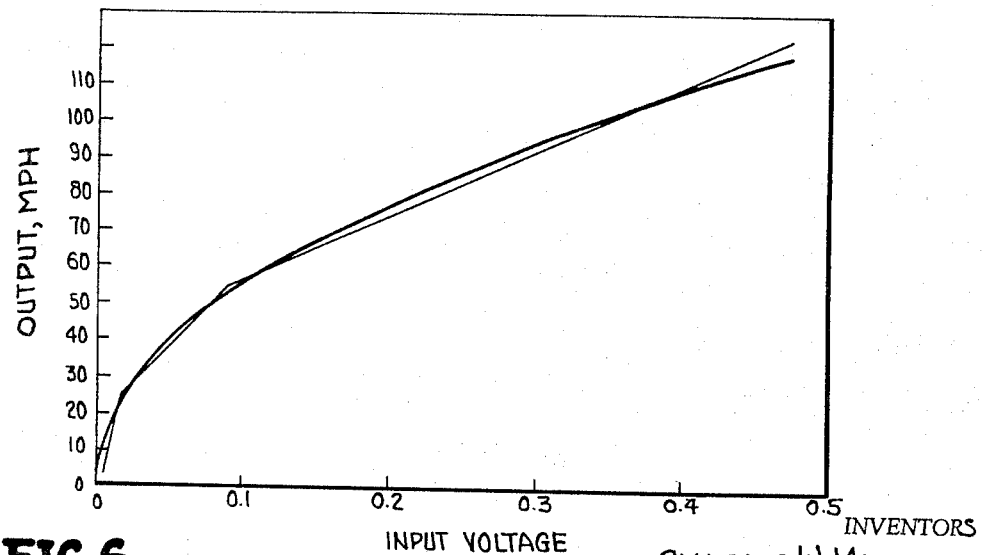
FIGURE 6 is a graph of the approximation of a square root transfer function by the amplifier of FIGURE 4.

Referring now to FIGURE 4, amplifier circuit 84 may comprise, for example, a conventional amplifier 94 to which the bridge output voltage is applied via a resistance element 93($R_1$), amplifier 94 having a feedback loop including a plurality of parallel paths one of which contains only a resistive element 95($R_2$) and each of the others containing a pair of back-to-back Zener diodes 97, 98 with a resistor 99 interposed therebetween. For purposes of simplicity and clarity, only one Zener diode loop is shown, but it will be understood that the number of parallel Zener diode networks will correspond to the number of gain changes required to provide the desired approximation of the square root transfer function (FIGURES 5 and 6). For each Zener diode circuit, the diode elements 97 and 98 are selected to conduct at a predetermined value of output voltage ($e_o$) so that the resistor in that loop (here, resistive element 99, or $R_3$) is placed in parallel with resistor 95. This, of course, increases the amount of feedback and correspondingly reduces the gain of amplifier 90.

The result of this operation of amplifier circuit 84 is shown more clearly by the transfer function curve of FIGURE 5, and the curve of FIGURE 6 in which output, in terms of m.p.h., is plotted against input in volts. In FIGURE 5 the slope of that portion from the origin (O) of the $e_1$ and $e_o$ axes to the point A (i.e., the line labeled OA) is solely a function of the values of resistance elements $R_1$(93) and $R_2$(95), or, mathematically $$\text{Slope } OA = R_2/R_1 \quad (4)$$

At the value of $e_o$ for point A, the first Zener diode loop is rendered conductive and the slope of the curve (a straight line) for the region between points A and B is determined by the value of $R_3$(99) as well as those of $R_1$ and $R_2$, i.e., $$\text{Slope } AB = \frac{1}{R_1}\left(\frac{1}{R_2} + \frac{1}{R_3}\right) \quad (5)$$

Similar results obtain at the point B, at which the value of $e_o$ is effective to bring the resistor associated with the next Zener loop into play in the determination of subsequent slope.

Each of FIGURES 5 and 6 show that within the limits of accuracy required, three or four diode networks may be sufficient to approximate the square root transfer function. The output of the electronics circuit, correlated to miles per hour of wind vector, as shown in FIGURE 6 (for specified values of voltage output from the bridge circuit, $e_b$, in the particular embodiment described above), may be transmitted to a receiving station by conventional telemetering equipment on the buoy; for example, a typical information on demand communications channel.

At the voltage range given and assuming a typical noise figure for operational amplifiers of 10 microvolts referred to the input, a signal-to-noise ratio $(S/N)$ of 28 db is obtained. Noise generated in the bridge circuit reduces this $S/N$ value somewhat, but the ratio may be improved, if desired, by increasing the output of the transducer, e.g., by increasing the length of wire on the load cell, by increasing the value of current through the load cell, and/or by increasing the size of the drag sphere.

If compatible with the overall system, the input to the bridges may be pulsed to obtain a much higher current (since ability of the transducer to dissipate heat, and, thereby, its current carrying capacity, is increased). This would also serve to eliminate drift since the output may be capacitively coupled to a suitable integrator or analog-to-digital converter. For test purposes, the X and Y components may be fed directly to the vertical and horizontal inputs of an oscilloscope.

Figure 7:
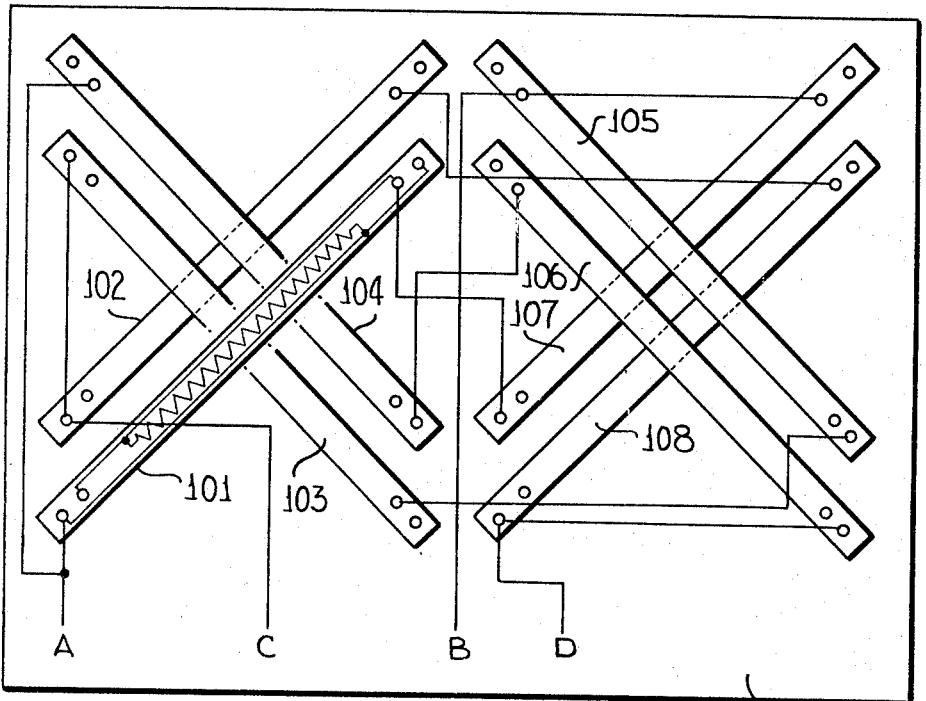
FIGURE 7 is a developed view of the outer surface of another embodiment of a load cell.
Figure 8:
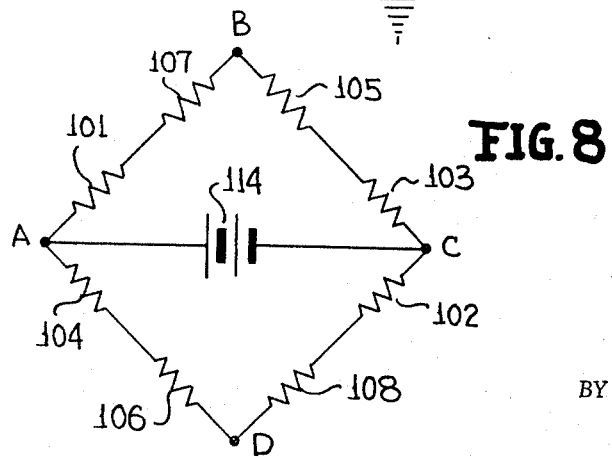
FIGURE 8 is a schematic diagram of the bridge circuit formed by the load cell of FIGURE 7.

In another embodiment constructed according to the principles of the invention, the load cell is included in a tube of relative large diameter for bending strength and composed of a material having a relatively low modulus of elasticity for sensitivity (in this embodiment, Plexiglas, although other materials such as polystyrene might also have been used). In order to increase the sensitivity of the load cell a full bridge of strain-sensitive elements was used, in contrast to the half bridge configuration previously described. Referring to FIGURE 7, which shows a developed surface of the load cell tube, and to FIGURE 8, showing the bridge arrangement in schematic form, eight strain gages, designated 101–108, were adhesively fastened to the surface 110 of the Plexiglas tube, four on each half of the cylindrical outer surface. As used here, each half of the surface is defined by the outer surface portions separated by an imaginary plane containing the axis of the tube.

A typical form of the strain gauge is shown schematically for the element 101 and it will be understood that each of the several strain-sensitive elements, although not shown in detail, may take that form or any of several other conventional forms. It should also be noted that for production quantities it is preferred, for purposes of both simplicity and economy, that the strain-sensitive elements be applied to the tube surface in the form of film strips of constantan, as by vacuum deposition or any other well known and suitable techniques. Such techniques may also be employed in place of the wire winding method of the previously described embodiment. In either case, the overlapping strain-sensitive elements are separated by a layer of insulative material and the exposed conductive portions, including any electrical leads or terminals, covered by a further insulative layer.

In the load cell embodiment of FIGURES 7 and 8, like reference numerals and letters designating like components, each strain-sensitive element was a one inch gauge length strain gauge with a resistance of 350 ohms. Higher resistance strain-sensing elements are preferable for production quantities. Elements 101 and 102 were arranged in parallel spaced relationship at an angle of 45° to the tube axis, and elements 103 and 104 arranged in parallel spaced relationship, also at an angle of 45° to the tube axis, but at right angles to the first two elements. A similar arrangement was employed for elements 105–108 on the other half of the tube surface. The conductive connections were added as shown to provide the bridge configuration of FIGURE 8.

A power supply 114 for the bridge was connected between points A and C forming one diagonal, and the bridge output taken across nodes B and D forming the other diagonal.

Figure 9:
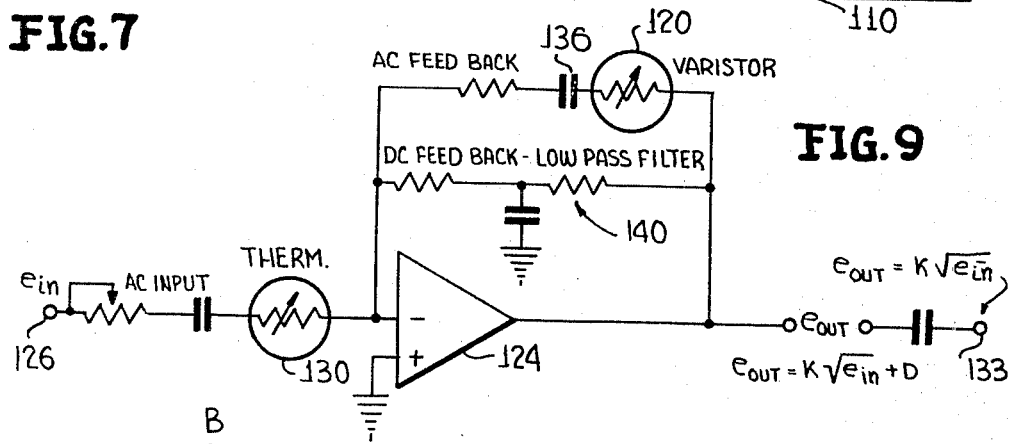
FIGURE 9 is a circuit diagram of another embodiment of the electronic circuit channel.

No-load drift of the load cell (bridge circuit) was reduced to a value on the order of microvolts per day by use of a relatively low voltage power supply (6 volts, for example) to substantially eliminate localized heating of the load cell tube, apparently the major cause of the drift. This value of drift voltage was found to be relatively insignificant in view of the substantially higher signal output of the load cell, on the order of millivolts. For situations in which the bridges are pulsed, which, as previously stated, is effective to increase the current-carrying capacity of the transducers, the electronics of FIGURE 9 may be employed. The pulsing may be carried out by a straightforward switching on and off of the bridge power and the use of capacitive coupling, but such operation requires a smooth transfer function. This is provided in the amplifier circuit of FIGURE 9, with a varistor 120 connected in the A-C feedback loop of conventional amplifier 124. The pulsed bridge output is applied at terminal 126 to an input network including a variable resistance, a coupling capacitor, and a thermistor 130. The thermistor serves to maintain the transfer function of the amplifier within $\pm 1\%$ (full scale) of the desired square root function by varying the gain of the amplifier to compensate for change in the exponent due to temperature effects on the varistor.

The A-C coupling (capacitive) of the amplifier is effective to eliminate amplifier drift at the output (terminal 133). If the amplifier drifts from zero and the bridge power is pulsed, the output height is not related to the square root of the input pulse height because of the effect of drift on the varistor. In such a case, the input and output are related by $$e_o = k\sqrt{e_i + D} - D \qquad (6)$$

where $D$ is the drift voltage and $k$ is the proportionality constant. Consequently, the feedback loop containing the varistor must be A-C coupled (using capacitor 136), and, because of the resulting instability caused by the open loop gain to D-C, a D-C feedback loop 140 is provided to control D-C gain without affecting operation during the pulse interval. To this end, the D-C feedback loop comprises a conventional low pass filter. The output taken at terminal 133 is then simply $$e_o = k\sqrt{e_i} \qquad (7)$$

which may be supplied to any common sample and hold circuit for subsequent telemetering of the wind vector values.

While we have described and illustrated one specific embodiment of our invention, it will be clear that variation of the details of construction which are specifically illustrated and described may be resorted to without departing from the true spirit and scope of the invention as defined in the appended claims.

We claim:
1. A static anemometer, comprising
   transducer means sensitive only to torsional forces of either sense about a normally vertical axis,
   anemometer module means comprising separate orthogonally related horizontally extending anemometer modules conjointly rotatable about said axis,
   means coupling said anemometer modules means to said transducer means for imparting torsional forces to said transducer means in response to wind flow past said anemometer module means, each of said anemometer modules including a drag element one one side of said axis and a counterbalance weight on the other side of said axis for achieving static and dynamic balance of said anemometer module means, wherein said transducer means includes means for vectorially combining signals produced by said torsional forces.

2. The combination according to claim 1 wherein is further included means responsive to said output signal of said transducer means for correlation thereof to wind speed.

3. The combination according to claim 1 wherein said support means comprises a floating platform and a vertical support projecting therefrom, and wherein said anemometer module means is carried by said support.

4. The combination according to claim3 wherein said transducer means comprises a load cell including a tubular non-conductive core having a pair of equal orthogonal helically wound layers of strain-sensitive wire thereon.

5. The combination according to claim 4 wherein said transducer means further includes electrical power supply means, and wherein said pair of layers of wire comprise a pair of arms of resistance bridge circuit, said supply means providing the power for said bridge circuit, and wherein is further provided circuit means for correlating the output of said bridge circuit to wind speed.

6. The combination according to claim 5 wherein said circuit means includes an amplifier having a transfer function approximating a square root transfer function to produce an output from said circuit means directly proportional to wind speed.

7. The combination according to claim 4 wherein each of said helically wound layers of wire is arranged at an angle of 45° to the axis of said core.

8. The combination according to claim 3 wherein said module means includes a further pair of co-linear opposed arms identical to the first-mentioned pair and spaced therefrom in a stacked orthogonal array, said transducer means including a pair of load cells each associated with and coupled to a separate pair of said first-mentioned and further pairs of arms, whereby the output signal of each load cell is proportional to an orthogonal component of the wind vector relative to the component acting on the pair of arms associated with the other load cell.

9. The combination according to claim 3 wherein said transducer means comprises a load cell including a tubular non-conductive core having a plurality of strain-sensitive elements thereon, said elements arranged in orthogonally oriented groups containing equal members of elements, the elements being interconnected to form a bridge network.

10. The combination according to claim 9 wherein each of said elements is disposed at an angle of 45° to the axis of said core.

11. A fluid current measuring system comprising:
torsion-sensitive transducer means including a pair of load cells for providing a pair of output signals proportional to and only in response to torsional stresses exerted on said load cells;
means for vectorially combining said output signals into an indication of said fluid current,
module means rotatable about a vertical axis responsive to fluid currents;
means for supporting said module means and said torsion sensitive transducer means in cooperative relationship so that fluid flow forces acting on said module means are sensed by said transducer means as corresponding torsional stresses, said means for supporting comprising a platform suitable for floating on a body of water and a vertical support projecting from said platform,
said module means comprising two pairs of co-linear opposed arms carried by said vertical support and extending horizontally therefrom, each pair of said arms being coupled to a respective one of said load cells, one arm of each pair including means for carrying a drag device having an exterior surface for producing turbulent boundary layer upon subjection of the drag device to flow, the other arm in each pair having secured thereto a counterweight for cancelling torque exerted on the first of said arms by pitch and heave accelerations of said support means, said pairs of arms being spaced from one another in a stacked orthogonoal array.

12. The combination according to claim 11 wherein is further included means responsive to said output signals of said load cells for correlation of said signals to speed of fluid current.

13. The combination according to claim 11 wherein said load cells each include a tubular electrically non-conductive core having a pair of orthogonal helically wound layers of strain-sensitive electrically conductive wire thereon, each layer of said pair being arranged at an angle of 45° relative to the longitudinal axis of said core.

14. The combination according to claim 13 wherein said transducer means further includes electrical power supply means, two resistance bridge circuits, said pairs of layers of wire in said load cells comprising a respective pair of arms in different ones of said bridge circuits, said electrical power supply means providing the power for said bridge circuits, and circuit means for correlating the outputs of said bridge circuits to speed of fluid current.

15. The combination according to claim 14 wherein said circuit means includes a pair of amplifiers connected to the outputs of respective ones of said bridge circuits, said amplifiers having transfer functions approximating a square root function to provide outputs from said circuit means directly proportional to flow speed.

16. The combination according to claim 11 wherein said load cells each include a tubular electrically non-conductive core having a plurality of strain-sensitive elements thereon, said elements arranged in orthogonally oriented groups containing equal numbers of elements, and means for interconnecting said elements in a bridge network.

References Cited
UNITED STATES PATENTS

| | | | |
|---|---|---|---|
| 2,850,896 | 9/1958 | Se Legue et. al. | 73—188 |
| 2,985,014 | 5/1961 | Doersam | 73—189 |
| 3,217,536 | 11/1967 | Motsinger et al. | 73—189 |
| 3,277,706 | 10/1966 | Godet | 73—189 |

FOREIGN PATENTS

| | | |
|---|---|---|
| 968,150 | 9/1964 | Great Britain. |

RICHARD C. QUEISSER, *Primary Examiner.*

J. W. MYRACLE, *Assistant Examiner.*